(12) United States Patent
Privitelli (10) Patent No.: US 10,183,718 B2
(45) Date of Patent: Jan. 22, 2019

(54) MODULAR FRAME FOR STAND-UP, MOTOR-DRIVEN SCOOTER

(71) Applicant: Greg Privitelli, Wilmington, CA (US)

(72) Inventor: Greg Privitelli, Wilmington, CA (US)

(*) Notice: Subject to any disclaimer, the term of this patent is extended or adjusted under 35 U.S.C. 154(b) by 0 days.

(21) Appl. No.: 15/729,524

(22) Filed: Oct. 10, 2017

(65) Prior Publication Data
US 2018/0099719 A1  Apr. 12, 2018

Related U.S. Application Data

(60) Provisional application No. 62/405,668, filed on Oct. 7, 2016.

(51) Int. Cl.
| | | |
|---|---|---|
| *B62K 3/00* | (2006.01) | |
| *B62K 19/20* | (2006.01) | |
| *B62K 19/24* | (2006.01) | |
| *B62K 25/20* | (2006.01) | |
| *B62K 19/32* | (2006.01) | |

(52) U.S. Cl.
CPC .............. *B62K 3/002* (2013.01); *B62K 19/20* (2013.01); *B62K 19/24* (2013.01); *B62K 19/32* (2013.01); *B62K 25/20* (2013.01)

(58) Field of Classification Search
CPC .......... B62K 3/02; B62K 3/002; B62K 19/00; B62K 19/18; B62K 19/06; B62K 15/00; B62K 15/006; B62K 17/00; B62M 1/00
See application file for complete search history.

(56) References Cited

U.S. PATENT DOCUMENTS

| | | | | |
|---|---|---|---|---|
| 4,799,702 A * | 1/1989 | Wang | ..................... | B62K 3/002 280/87.041 |
| 5,163,696 A * | 11/1992 | Pesco, Sr. | .............. | B62K 3/002 280/221 |
| 6,168,175 B1 * | 1/2001 | Lan | ......................... | B62K 3/002 280/263 |
| 6,769,706 B2 * | 8/2004 | Chow | ..................... | B62K 3/002 280/253 |
| 8,733,491 B2 * | 5/2014 | Kalani | ..................... | B62K 3/002 180/219 |
| 9,440,698 B2 * | 9/2016 | Dadoosh | ................. | B62K 3/002 |
| 2004/0124599 A1 * | 7/2004 | Cheng | .................... | B62K 3/002 280/87.041 |
| 2004/0135334 A1 * | 7/2004 | Cheng | .................... | B62K 3/002 280/87.03 |
| 2004/0196968 A1 * | 10/2004 | Yue | .......................... | H04L 29/06 379/210.02 |
| 2010/0187790 A1 * | 7/2010 | Yu | .......................... | B62K 3/002 280/221 |
| 2013/0320648 A1 * | 12/2013 | Eckert | ..................... | B62K 3/002 280/279 |
| 2015/0137481 A1 * | 5/2015 | Manternach | ........... | B62K 5/007 280/400 |

* cited by examiner

*Primary Examiner* — James A Shriver, II
*Assistant Examiner* — James J Triggs (57) ABSTRACT

This design incorporates four separate modules which are bolted together in this succession: a welded, structural single-unit steering tube/downtube module; independent, twin, front-to-rear horizontal frame rails which serve as the support for the rider to stand; a welded, structural single-unit module to mount shock absorbers and a swingarm; and, a welded swingarm. The defined space between the twin frame rails and the two adjoining modules can be modified by altering the length of the frame rails and/or using spacers between each rail and its corresponding module at the bolt-on location.

3 Claims, 12 Drawing Sheets

MODULAR FRAME FOR STAND-UP, MOTOR-DRIVEN SCOOTER

CROSS-REFERENCE TO RELATED APPLICATIONS

This application claims the benefit of U.S. Provisional Patent Application No. 62/405,668, filed Oct. 7, 2016.

BACKGROUND

The kick-scooter was originally designed for children as a recreational toy. Various developments such as frame and/or wheel sizes and optional equipment have spurred popularity of the vehicle as a mode of short-hop transportation for people of all ages. In tandem, electric vehicles, specifically scooters, have also risen in popularity for use as commuter transportation as an alternative to automobiles or motorcycles. FIGS. 1A, 1B, 2, 3, 4A and 4B each show conventional scooters.

SUMMARY

The disclosure provides for utilizing an improved frame structure comprised of a steering tube and downtube, which are typically welded, that support a rotatable fork and attached front wheel, a handlebar stem, and handlebars. The bottom of the downtube is attached to the base platform of the frame upon which the rider stands. This junction can be welded or bolted, or shaped as a single, continuous unit from bent tubular or pressed metal.

The front of the base platform extends rearward with sufficient length for the rider to stand with feet positioned one in front of the other, typical of the stance upon riding a skateboard. Right side and left side parallel supports of tubular or pressed metal extend rearward from the rear side of the base platform, and can also be shaped as one continuous unit of the base, to a length suitable for the attachment of a rear wheel assembly. The embodiment of a kick-scooter frame design, or any particular feature thereof, is not-limited. Accordingly, in an alternate embodiment from the above described, the kick-scooter frame may incorporate a hinged or collapsible frame, or, a shock absorbing mechanism on the front forks or rear wheel frame assembly. Also, the electric motor-driven frame designs incorporate a defined space within the base platform to house the battery, therefore, the dimensions of the battery must be defined prior to the manufacture of the frame. Batteries manufactured for typical scooter motors are nonstandardized sizes. With ever-advancing technology of the battery, such as capacity and efficiency while maintaining comparably reduced size dimensions, upgrading to a new battery, for the advantage of shorter recharge time and greater travel distance per charge, would be impossible if the battery was only slightly larger in dimension than the original battery for which the frame was designed.

It is the objective of the foregoing arrangement to prevent obsolescence of the entire vehicle due to continual advancements in battery technology. By swapping out only one module, the twin, front-to-rear horizontal frame rails of different dimensions than the original, the battery's defined space can accommodate any reasonably, nonstandardized sized battery with the latest technological advancements. The other three original modules, and any/all corresponding components that make up the complete embodiment of the vehicle, remain.

DETAILED DESCRIPTION

Figure 1A:
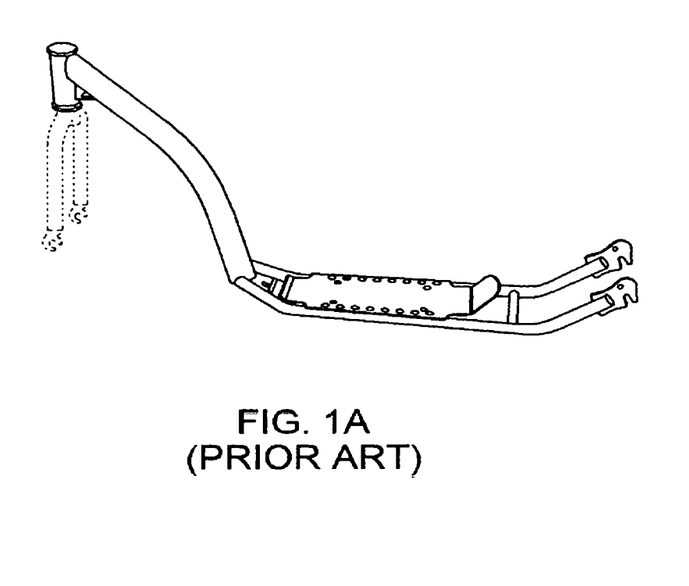
FIGS. 1A, 1B, 2, 3, 4A and 4B each show conventional kick-scooters.
Figure 1B:
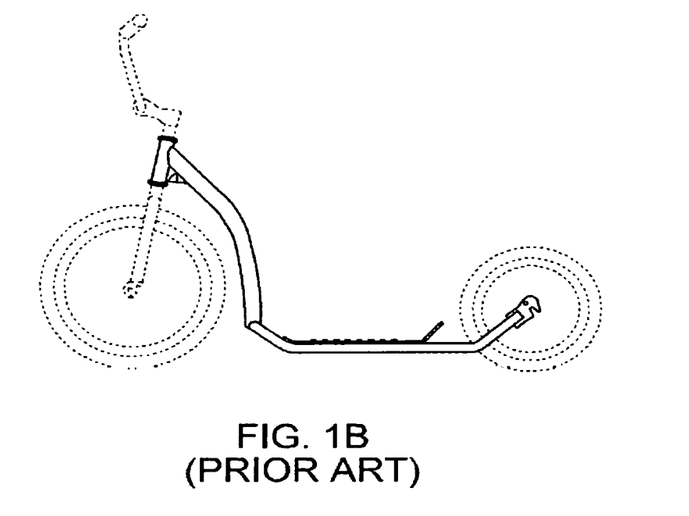
Figure 2:
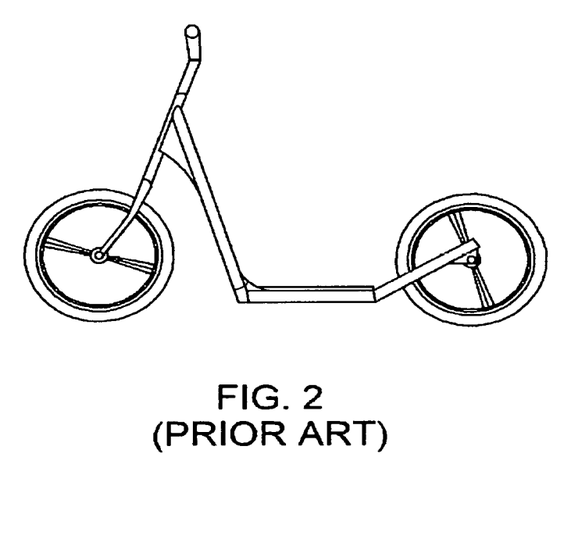
Figure 3:
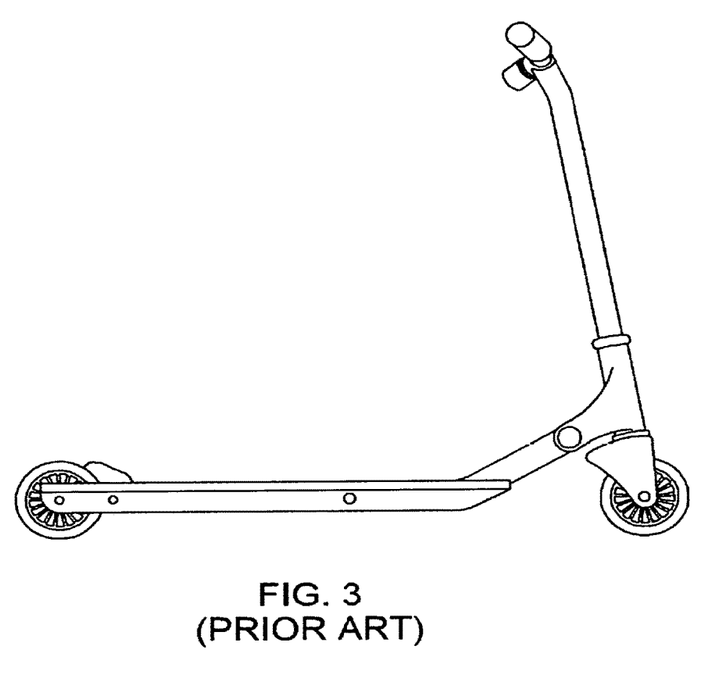
Figure 4A:
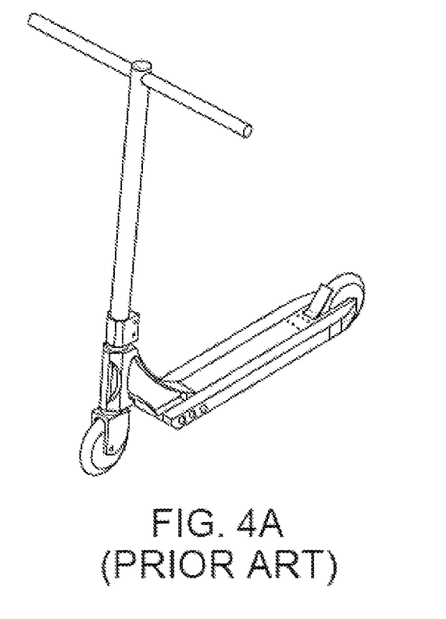
Figure 4B:
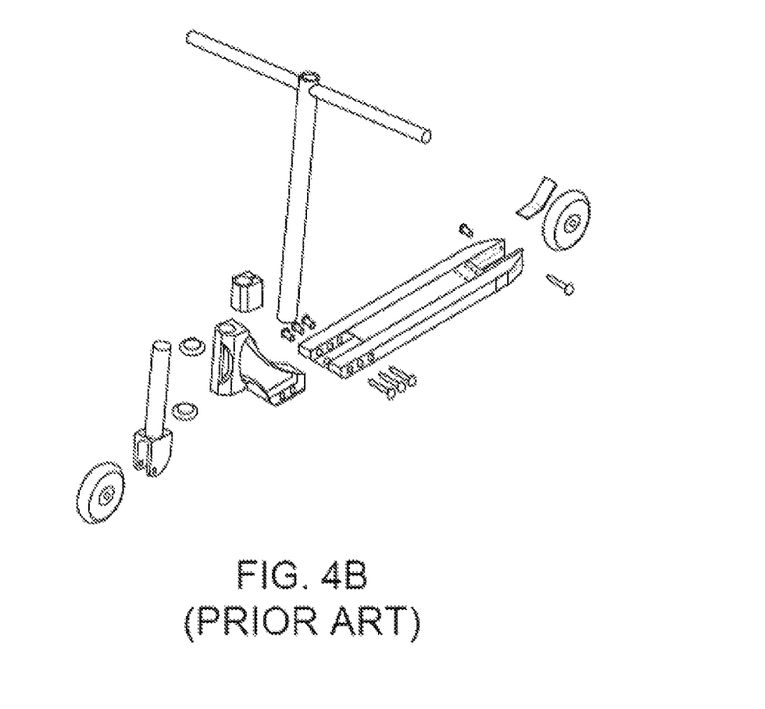
Figure 5:
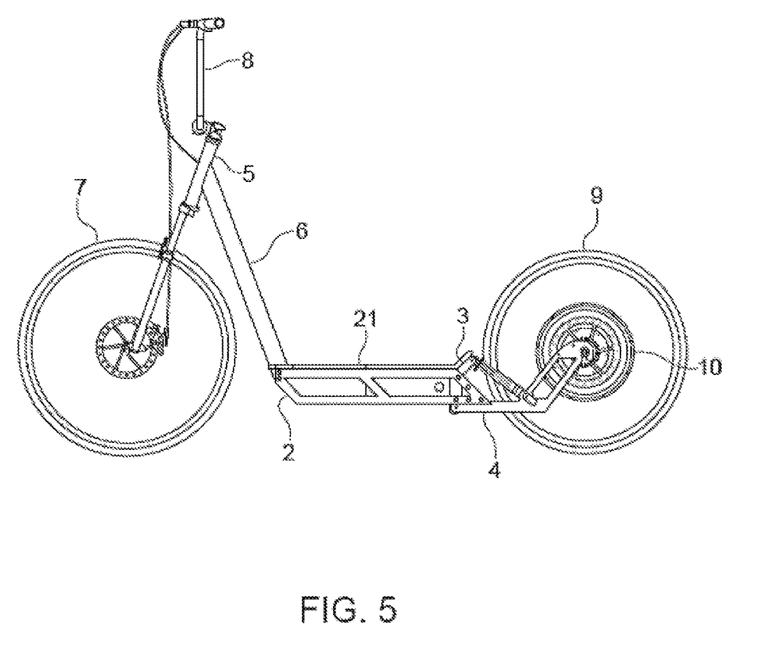
FIG. 5 shows a kick-scooter complete and ready-to-ride, according to an example embodiment herein.

FIG. 5 shows a kick-scooter fully assembled, completed with all necessary components to ride the vehicle. In an example embodiment, 26" mountain bike sized wheel assemblies are utilized which makes the vehicle suitable for adult riders.

Figure 6:
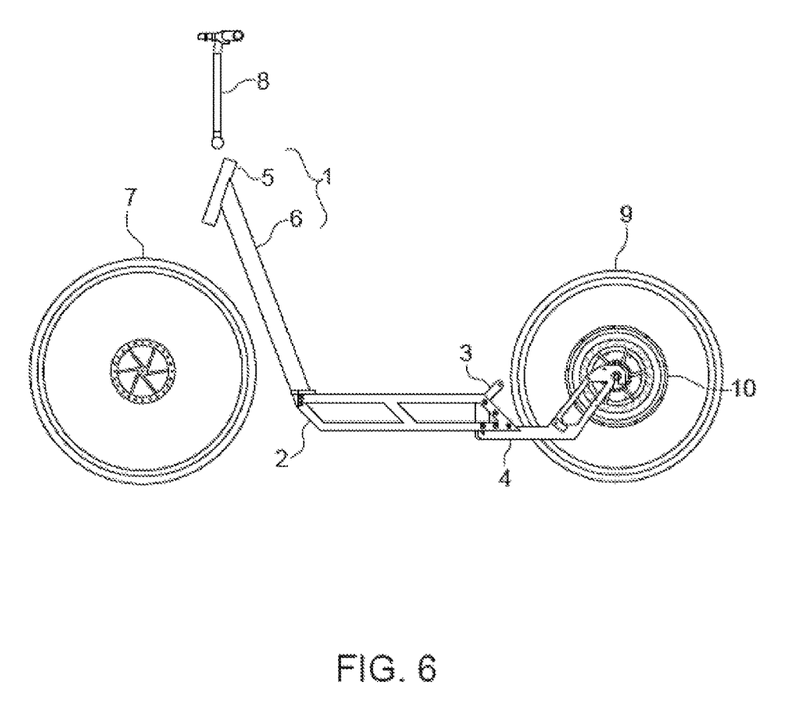
FIG. 6 shows a view of the kick-scooter with ancillaries and components removed for clarity of frame structure.

FIG. 6 is an exploded view of FIG. 5 but with many of the components removed to show the actual frame structure more precisely. The wheel assemblies (7,9) are not limited to standard 26" mountain bike sized wheels. The electric hub motor (10) is a product that comes in many output capacities and is not limited to any. The greatest benefit of this disclosure is the four modules: the steering tube (5) is connected to the downtube (6) and makes up a first module 1 in the succession of the four modules. A second module (2) or frame rails module, as shown in FIG. 6, is the left side rail. The second module (2) also includes a right side rail (hidden in the view shown in FIG. 6) being parallel and a twin to the left side rail. The second module (2) is the designated space for the battery (21) depicted in FIG. 5. This module can be changed with similar rails of the same bolting pattern but of different length and heights. Batteries for electric motors are continually changing and improving with updated technology. As there is no specific standardized sizes, an aftermarket battery could prove to be impossible to mount within the designated space. Having the ability to change only this module, with the three other modules remaining, the benefits of the updated technology may translate into shorter charging time, longer distances for travel between recharging and greater power output. A third module (3), the shock absorber and swingarm mount (3a and 3b respectively, shown in FIG. 7), is partially hidden in this view. A fourth module (4) or swingarm is partially hidden in this view.

Figure 7:
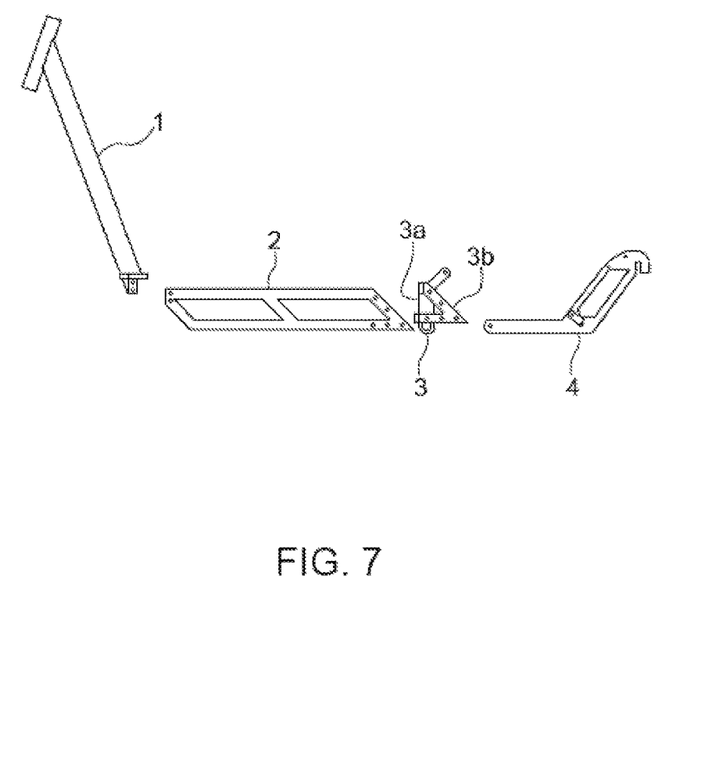
FIG. 7 shows four modules of a kick-scooter in an exploded view, according to an example embodiment.

FIG. 7 is a partially exploded view of the four modules (1,2,3,4) in a line.

Figure 8:
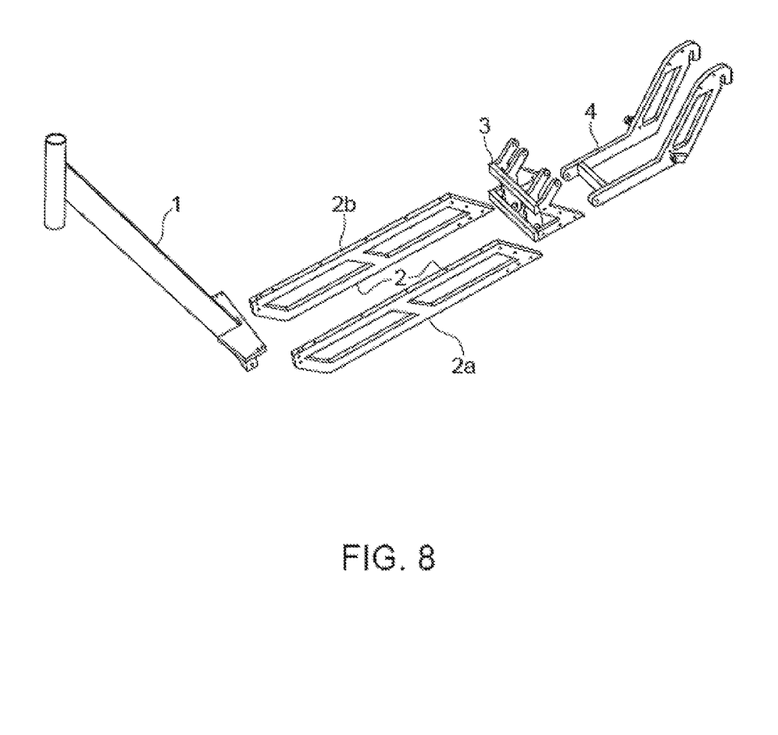
FIG. 8 shows the four modules in an exploded view canted side angle.
Figure 9:
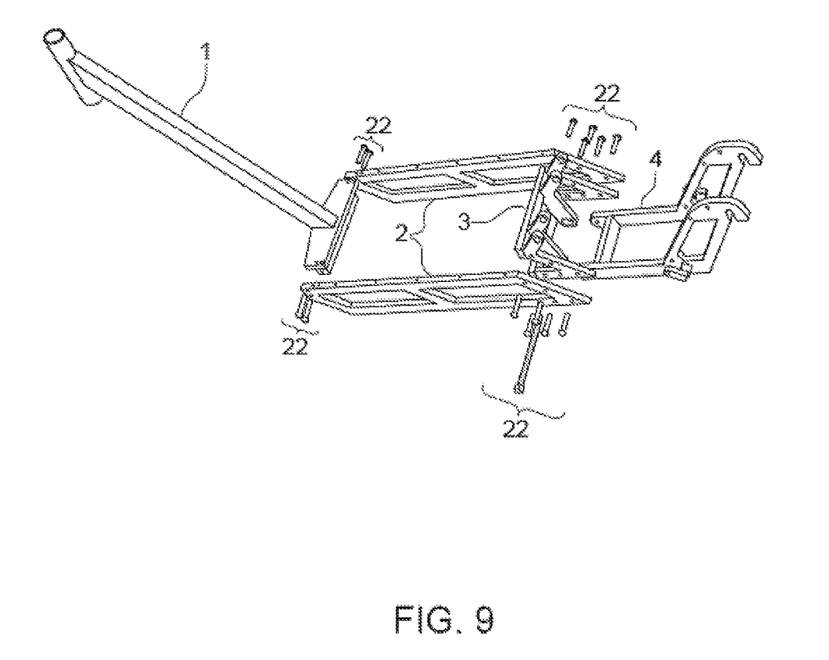
FIG. 9 shows the four modules viewed in a canted angle with paths of bolts.
Figure 10:
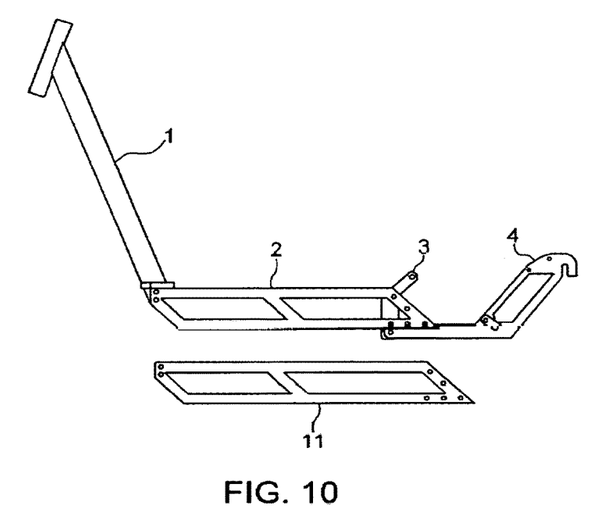
FIG. 10 shows an aftermarket, longer than original frame rail.
Figure 11:
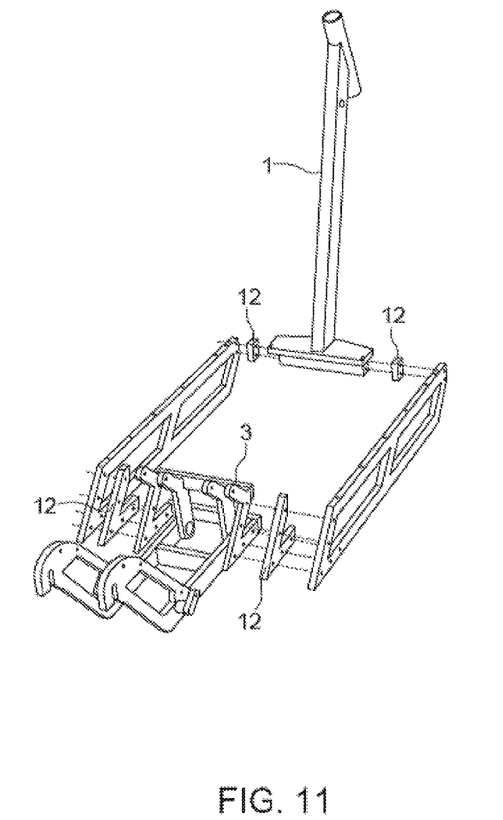
FIG. 11 shows the four modules with an exploded rear angle view with rail spacers.

FIG. 8 is an overhead view to show off the twin frame rails of module 2. The bolt paths (22) are shown in FIG. 9 to show how all four modules are joined. Exposed in FIG. 10 is an original equipment frame rail module (2) and the aftermarket, longer version of the rail (11). Length is limited only to a reasonably sized battery considering weight and overall dimensions. FIG. 11 shows an exploded view of the four modules with widening spacers (12) in between the frame rails and their corresponding bolt on positions to the modules (1,3).

Figure 12:
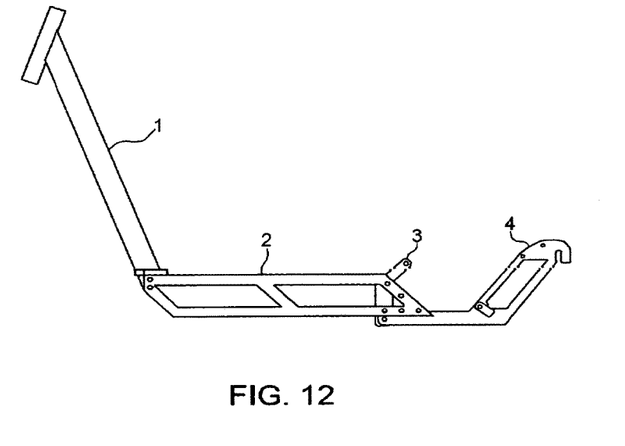
FIG. 12 is a representative view of the four modules according to an example embodiment.

FIG. 12 shows a side view of a the four modules (1,2,3,4) constructed together.

The invention claimed is:

1. An electric kick-scooter comprising:
a first module including a steering tube and a downtube, the steering tube being welded to the downtube forming a single-unit;
a second module including two front-to-rear horizontal frame rails, the second module being an independent structure from the electric kick-scooter and the two front-to-rear horizontal frame rails being parallel twins, wherein the first module is connected to the second module via one or more bolts;
a third module including a shock absorber mount and a swingarm mount, the shock absorber mount being welded to the swingarm mount forming a single-unit, wherein the third module is connected to the second module via one or more bolts and at least two shock absorbers are bolted to the shock absorber mount; and
a fourth module including a swingarm, wherein the fourth module is connected to the third module via one or more bolts,
wherein the second module is adapted to receive a battery of differing size or shape, and
wherein the first module, the second module, the third module and the fourth module are bolted together in succession.

2. The electric kick-scooter frame structure according to claim 1, the electric kick-scooter further comprising a first set of spacers provided between the first module and the second module, the first set of spacers being disposed such that the one or more bolts pass through the first set of spacers, and a second set of spacers provided between the second module and the third module, the second set of spacers being disposed such that the one or more bolts pass through the second set of spacers.

3. The electric kick-scooter frame structure according to claim 1, further comprising:
an electric hub motor connected to the fourth module.

* * * * *